United States Patent [19]
Hendrickson

[11] Patent Number: 5,469,738
[45] Date of Patent: Nov. 28, 1995

[54] WIND SPEED INDICATOR

[76] Inventor: David L. Hendrickson, 7490 N. Navajo Rd., Fox Point, Wis. 53217

[21] Appl. No.: 259,473
[22] Filed: Jun. 14, 1994
[51] Int. Cl.⁶ ........................................................ G01F 1/00
[52] U.S. Cl. ........................ 73/170.07; 116/264; 446/217; 73/861.85
[58] Field of Search ........................... 73/170.07, 861.85; 116/202, 264, 265, 273, 274; 446/217, 218

[56] References Cited

U.S. PATENT DOCUMENTS

| | | | |
|---|---|---|---|
| 2,346,864 | 4/1944 | Packard | 73/861.85 |
| 2,579,349 | 12/1951 | Vrooman | 116/202 |
| 4,854,579 | 8/1989 | Baxter | 73/861.85 |

Primary Examiner—Richard Chilcot
Assistant Examiner—Ronald L. Biegel
Attorney, Agent, or Firm—Andrus, Sceales, Starke & Sawall

[57] ABSTRACT

A wind speed indicator includes a series of spaced individual indicia provided on a member which is rotatable in response to movement of air caused by the wind. The indicia may take the form of individual dots spaced equally about the circumference of a circle centered on the axis of rotation of the rotatable member so that, when the rotatable member is rotated, the dots cooperate to define a virtual ring when rotated above a predetermined angular velocity in response to a predetermined threshold wind speed. Additional series of individual indicia, such as dots, are formed about succeeding smaller concentric circles and are spaced farther apart. As wind speed increases, additional virtual rings are apparent to indicate when wind speed has exceeded additional predetermined thresholds. The indicia can either be provided on an impeller which is directly rotated by the wind, or on a rotatable member which is rotatably driven in response to rotation of a separate impeller rotatably driven by the wind. In a preferred form, the components are incorporated into a system resembling that of a weather vane in order to simultaneously provide an indication of wind direction and an indication of wind speed.

19 Claims, 6 Drawing Sheets

WIND SPEED INDICATOR

BACKGROUND AND SUMMARY OF THE INVENTION

This invention relates to a device and method for providing a visual indication of wind speed.

Weather vanes are commonly used to provide a visual indication of wind direction. To date, however, there is no satisfactory known system for providing a reliable and accurate visual indication of wind speed. Baxter U.S. Pat. No. 4,854,579, issued Aug. 8, 1989, discloses one form of a wind speed indicator in which colored indicia are provided on the blades of a propeller, which are spaced apart 180° from each other. The propeller turns under the influence of the wind, and the colored indicia provide the appearance of a colored ring as the propeller turns. The color intensity of the ring is said to vary according to wind speed, and the actual color intensity of the ring is compared to a chart of various color intensities to calculate wind speed. This device is very limited in its ability to indicate wind speed, since only a very rough estimation of wind speed can be ascertained by comparing the color intensity of the ring with that of the chart. Further, variance in ambient light or other conditions not related to wind speed could have an effect on the color intensity of the ring, thus decreasing the reliability of the wind speed indicator.

It is an object of the present invention to provide a wind speed indicator which is capable of indicating a large number of wind speeds above predetermined threshold wind speeds. It is a further object of the invention to provide a wind speed indicator having a construction which provides a reliable indication of wind direction, in which the wind speed indicating components also function to provide an indication of wind direction. It is a further object of the invention to provide a wind speed indicator which is relatively simple in its construction and operation, and which nonetheless provides a reliable indication of wind speed. A further object of the invention is to provide a wind speed indicator which is extremely easy to read, and in which the wind speed indication can be read from a distance.

In accordance with one aspect of the invention, a wind speed indicator includes an impeller which is driven by the wind and a rotatable member drivingly interconnected with the impeller, so that the rotatable member rotates in response to the impeller being driven by the wind. Wind speed indicia is provided on the rotatable member for visually indicating wind speed based on the speed of rotation of the rotatable member. The rotatable member and the impeller are preferably mounted toward opposite ends of a base, which is mounted for pivoting movement between the impeller and the rotatable member. The rotatable member is preferably planar, and acts as a rudder to provide pivoting movement of the base in response to changes in wind direction. The wind speed indicia are preferably in the form of a series of spaced individual indicia having as loci the circumference of a circle, the center of which is coincident with the axis of rotation of the rotatable member. The series of spaced individual indicia provide the appearance of a ring when rotated above a predetermined angular velocity in response to rotation of the impeller as caused by wind above a first threshold wind speed. One or more additional series of spaced individual indicia are also provided on the rotatable member, with each additional series having as loci the circumference of a circle having its center coincident with the axis of rotation of the rotatable member. Each additional series of spaced individual indicia provide the appearance of a ring when the rotatable member is rotated above a threshold angular velocity in response to rotation of the impeller caused by a threshold wind speed. In this manner, one virtual ring is apparent when wind speed exceeds a first threshold, two virtual rings are apparent when the wind speed is above a second threshold greater than the first threshold, three virtual rings are apparent when wind speed exceeds a third predetermined threshold greater than the first and second thresholds, and so on. The first series of individual indicia are located a first distance from the axis of rotation of the rotatable member and are spaced apart at a first spacing. A second series of spaced individual indicia are located at a second distance from the axis of rotation of the rotatable member, less than the first distance, and are spaced apart at a second spacing different than the first spacing. Additional series of individual indicia are located inwardly of the first and second series, with each additional series being located closer to the axis of rotation of the rotatable member than the preceding series, and with the spacing between the indicia in each additional series being different than the spacing between the individual indicia in the preceding series. The spacing between the individual indicia in each series is preferably either incrementally greater than or less than the spacing between the indicia in the adjacent series. This arrangement provides the appearance of successive adjacent virtual rings as wind speed increases.

In accordance with another aspect of the invention, the spaced individual indicia can be provided on the blades of the impeller, which is mounted toward one end of the base. A rudder is provided on the opposite end of the base to pivot the base in response to change in wind direction. In this embodiment, the impeller blades are relatively large, and each presents a relatively wide surface on which several spaced individual indicia are located. This embodiment indicates wind speed by viewing the impeller and determining the number of virtual rings which are apparent when the impeller is rotated by the wind.

The invention also contemplates a method of providing a visual indication of wind speed, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
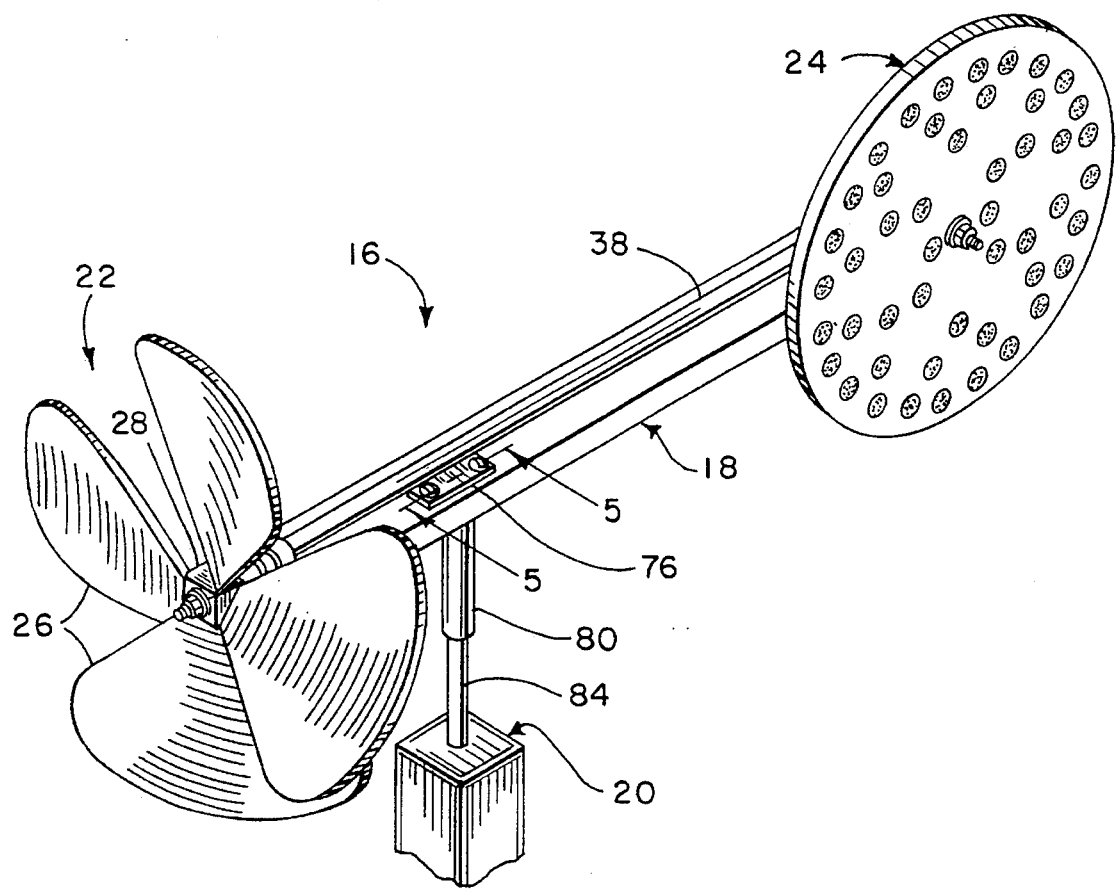
FIG. 1 is an isometric view of the wind speed indicator constructed according to the invention.

Referring to FIG. 1, a wind speed indicator 16 constructed according to the invention generally includes a base 18 pivotably mounted to a support 20, an impeller 22 mounted to one end of base 18 and a rotatable member 24 mounted to the opposite end of base 18. The pivotable mounting of base 18 to support 20, which will later be explained in detail, between impeller 22 and rotatable member 24 enables base 18 to pivot in response to a change in wind direction. Rotatable member 24 is in the form of a planar disc-like member, which acts as a rudder to cause pivoting movement of base 18 relative to support 20 in response to a change in wind direction.

Figure 2:
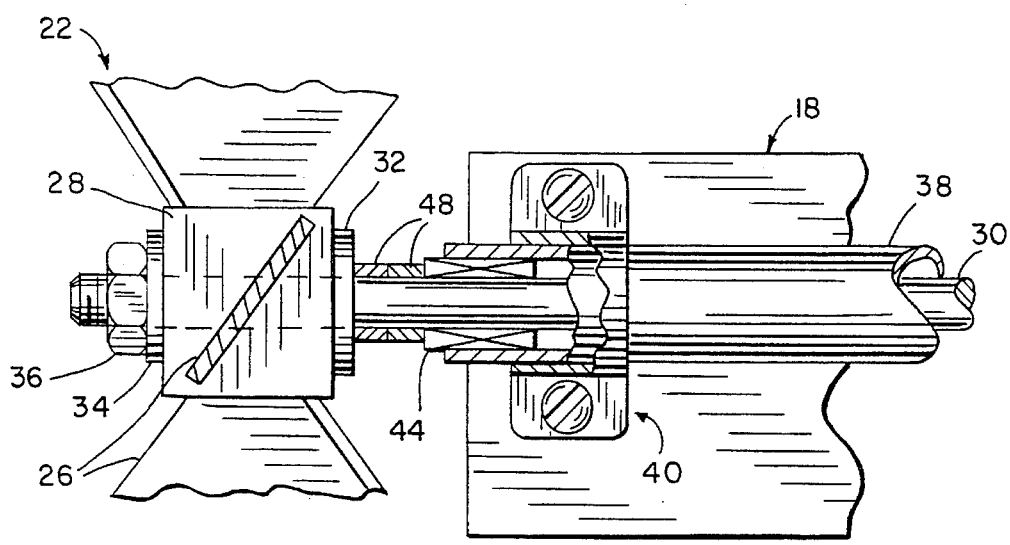
FIG. 2 is a partial top plan view, with portions in section, showing the impeller of the wind speed indicator of FIG. 1.

Referring to FIGS. 1 and 2, impeller 22 includes blades 26 which extend outwardly from a hub 28. A shaft 30 drivingly interconnects impeller 22 and rotatable member 24, and impeller 22 is mounted to one end of shaft 30. Shaft 30 extends through a horizontal passage formed in impeller hub 28, which abuts a stop 32. A washer 34 engages the end of hub 28 opposite stop 32, and a nut 36 is threadedly engaged with threads formed on the end of shaft 34 securely mounting impeller 22 to shaft 30.

Impeller hub 28 is mounted to shaft 30 in any satisfactory manner which fixes the rotational position of impeller 22 relative to shaft 30. For example, the portion of shaft 30 which extends through hub 28 may have a non-circular cross section mating with a correspondingly shaped passage formed in hub 28 to non-rotatably fix impeller 22 to shaft 30. Alternatively, a key and keyway arrangement could be employed to fix impeller 22 to shaft 30, or any other satisfactory arrangement may be used.

Shaft 30 extends through a tube 38 which is clamped to base 18 via conventional U-shaped clamps 40, 42 (FIGS. 2, 3) which are engaged with tube 38 adjacent its ends and secured to base 18. Bearings 44, 46 (FIGS. 2, 3) are mounted in the ends of tube 38, and shaft 30 extends through bearings 44, 46 for rotatably mounting shaft 30 within the internal passage defined by tube 38. As shown in FIG. 2, spacers 48 are interposed between fixed stop 32 and bearing 44.

Figure 3:
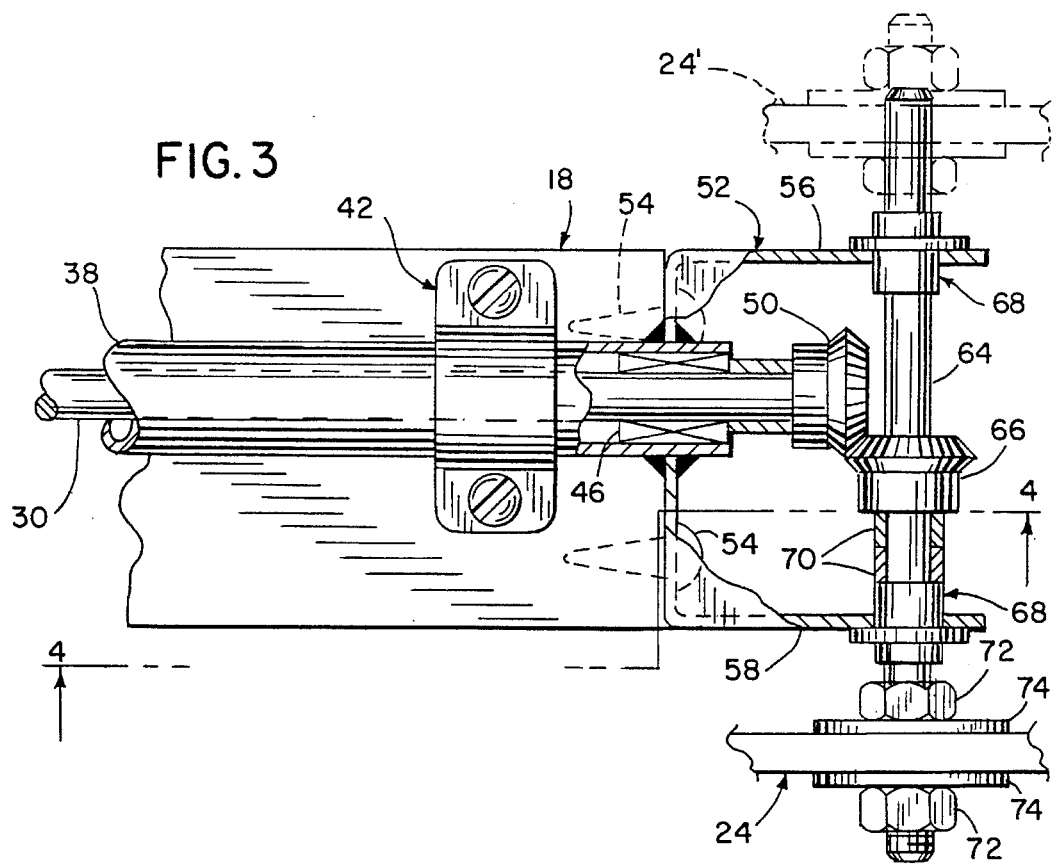
FIG. 3 is a partial top plan view, with portions in section, showing the rotatable member of the wind speed indicator of FIG. 1 and the manner in which the rotatable member is mounted to the base.
Figure 4:
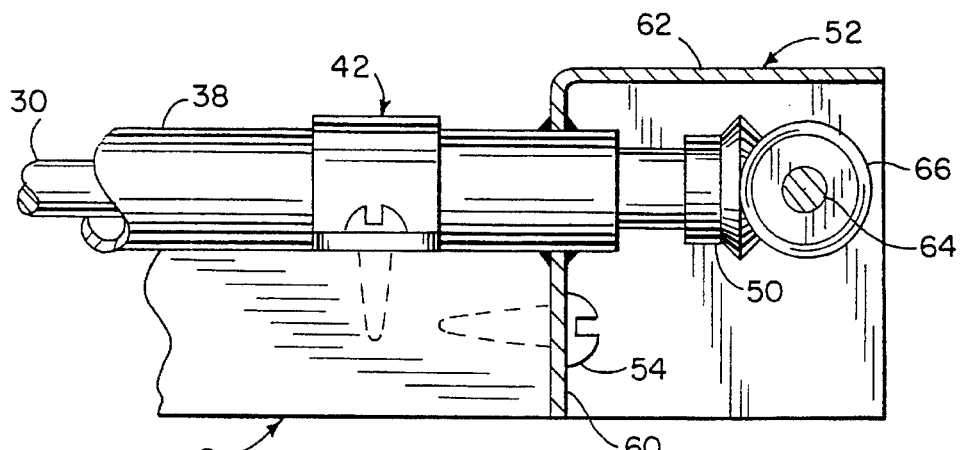
FIG. 4 is a section view taken along line 4—4 of FIG. 3.

As shown in FIGS. 3 and 4, a bevel or miter gear 50 is fixed to the end of shaft 30 opposite impeller 22. Miter gear 30 is housed within a gear box 52 mounted to base 18 via screws 54. Gear box 52 includes a pair of side walls 56, 58, an end wall 60 (FIG. 4) and a top wall 62. Tube 38 extends through an opening formed in gear box end wall 60, and is soldered or brazed thereto.

A cross-shaft 64 extends through gear box 52 outwardly of its side walls 56, 58, and a miter gear 66 is fixed to cross-shaft 64. Miter gear 66 has teeth which engage the teeth of miter gear 50, so that rotation of shaft 30 is transferred through miter gears 50, 66 to rotate cross-shaft 64. Cross-shaft 64 extends through bearings 68 which are engaged within aligned openings formed in gear box side walls 56, 58. Cross-shaft 64 extends through spacer rings 70, which are disposed between bearing 68 and miter gear 66 for maintaining miter gear 66 in engagement with miter gear 50.

A portion of cross-shaft 64 extends outwardly from gear box side walls 56, 58. Rotatable member 24 is non-rotatably mounted to cross-shaft 64 externally of gear box 52. Nuts 72 and washers 74 are provided on either side of rotatable member 24, with nuts 72 being threadedly engaged with threads formed at the end of cross-shaft 64. Rotatable member 24 is sandwiched between washers 74, to securely and nonrotatably mount rotatable member 24 to cross-shaft 64. It is understood that any other satisfactory mounting method could also be employed.

If desired, a rotatable member 24', shown in phantom in FIG. 3, could be mounted to the opposite end of cross-shaft 64 so that a rotatable member is located on either side of gear box 52.

Figure 5:
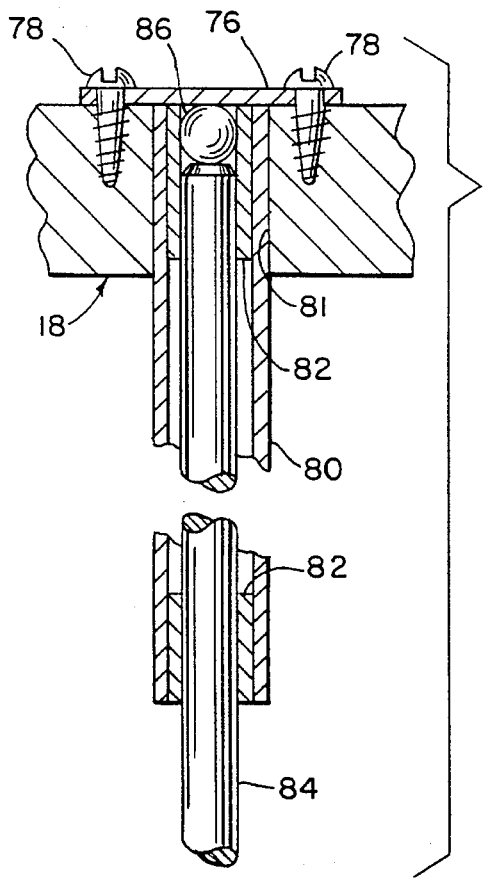
FIG. 5 is a partial section view taken along line 5—5 of FIG. 1.

FIG. 5 illustrates the manner in which base 18 is pivotably mounted to support 20. A plate 76 is mounted to base 18 via screws 78 extending through openings formed in plate 76 and into base 18. A sleeve 80, defining an internal passage, is fixed to base 18, being received within a mating opening 81 extending vertically through base 18. Bushings 82 are mounted within sleeve 80 toward its ends, and a vertical shaft 84 extends upwardly from support 20 into sleeve 80 and through bushings 82. A steel ball 86 is located between the upper end of shaft 84 and plate 76, providing a low-friction pivotable support for base 18 on vertical shaft 84.

Figure 6:
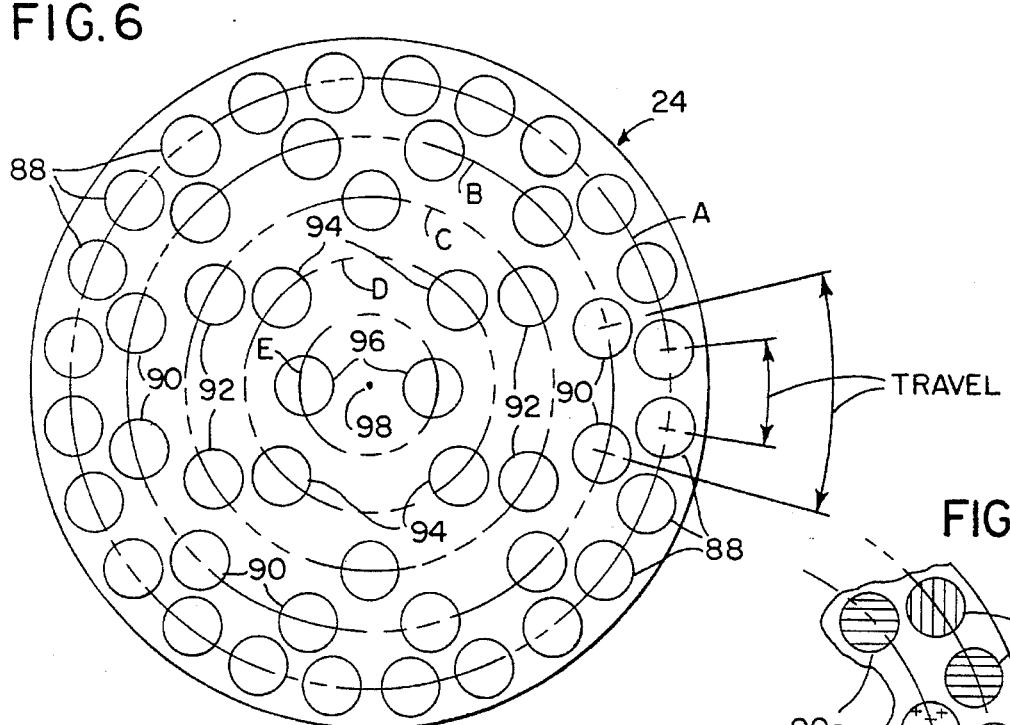
FIG. 6 is an elevation view of the rotatable member of the wind speed indicator of FIG. 1.

Referring to FIG. 6, rotatable member 24 is provided with an outer series of spaced dots 88, and successive inner series of spaced dots 90, 92, 94 and 96. Dots 88–96 are indicia which, in a manner to be explained, provide a visual indication of wind speed upon rotation of rotatable member 24 in response to impeller 22 being driven by the wind. Dots 88 are equally spaced apart, and the center of each dot 88 is located on the circumference of a circle A, the center of which is coincident with the axis of rotation of rotatable member 24, shown at 98. Similarly, the centers of dots 90 are equally spaced on a circle B, the centers of dots 92 are equally spaced on a circle C, the centers of dots 94 are equally spaced on a circle D, and the centers of dots 96 are equally spaced on a circle E. Circles A–E are concentric, with each succeeding circle having a lesser diameter than the preceding circle. The following table illustrates a representative layout of dots 88–96 on rotatable member 24:

| Circle | DIA | CIRCUM | # Dots | Angle | Travel | Linear Diff. |
|---|---|---|---|---|---|---|
| A | 8 | 25.13 | 24 | 15 | 1.05 | 0.65 |
| B | 6.5 | 20.42 | 12 | 30 | 1.70 | 0.92 |
| C | 5 | 15.70 | 6 | 60 | 2.62 | 0.13 |
| D | 3.5 | 11.00 | 4 | 90 | 2.75 | 0.39 |
| E | 2 | 6.28 | 2 | 180 | 3.14 | |

In this table, the dots 88–96 are placed at whole angles, measured in degrees. The Travel is the linear distance a dot must move to reach the position of an adjacent dot. The Linear Difference is the difference between the Travel at a given diameter and the Travel at the next diameter. In this example, the number of dots of each diameter was chosen on the criterion of being a rational divisor of 360 degrees. In this example, all distance measurements are in inches.

As shown in the above table, the angle between dots 88 is less than the angle between adjacent dots 90, and the angle between adjacent dots continues to increase on the dots toward the center of rotatable member 24. Likewise, the spacing between adjacent dots increases toward the center of rotatable member 24.

Other bases are possible for determining the position of the indicia. For example, the indicia may be arranged such that changes in Travel between adjacent indicia are held to uniform, or nearly uniform, steps for each series of indicia, and/or Linear Difference is a constant. It is also not necessary that the Travel distance increase with decreasing diameter. For example, in order to measure a greater range of wind speeds, it may be advantageous to position many dots on a smaller diameter (small Travel distance) and to position fewer dots on a larger diameter. It is also possible to mix diameter/Travel parameters randomly, e.g. so that virtual rings form not in incremental steps with wind velocity changes and decreasing diameter.

Figure 7:
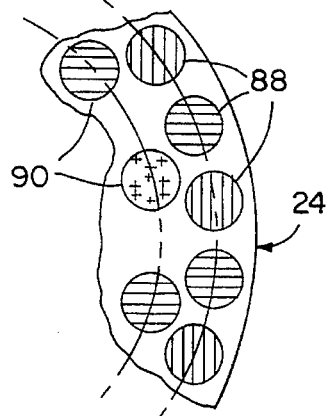
FIG. 7 is an elevation view of a portion of the rotatable member of FIG. 6, showing colors of the spaced individual indicia.

As shown in FIG. 7, dots 88–96 may be alternately colored. While the following description of the operation of the wind speed indicator assumes alternately colored dots, the dots may also be of the same color. If the dots disposed on a given diameter are of the same color, the virtual ring formed at that diameter's unique threshold velocity will be paler in hue than an individual dot.

In operation, wind speed indicator 16 functions as follows. Movement of air, caused by wind, imparts rotation to impeller 22 in a conventional manner. Rotatable member 24, being substantially planar and oriented vertically, acts as a rudder to cause base 18 to pivot relative to support 20 in response to changes in wind direction, so that base 18 is substantially aligned with wind direction at all times.

Figure 8:
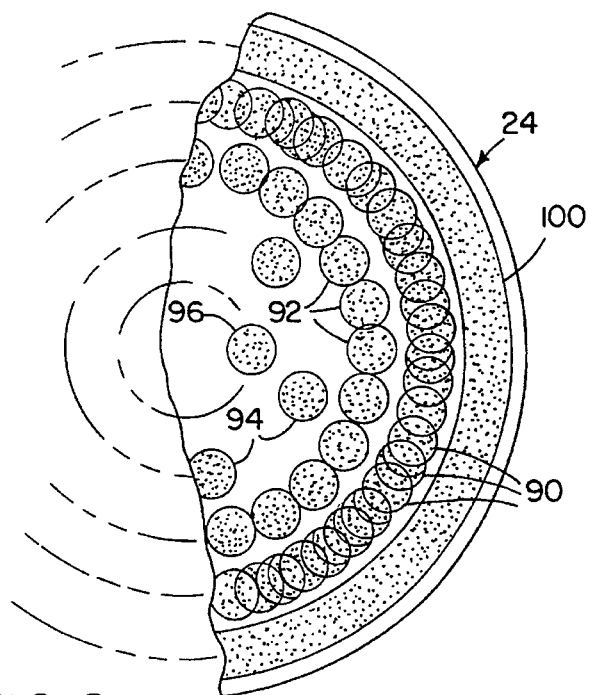
FIG. 8 is a partial elevation view of the rotatable member of FIG. 6, showing the formation of virtual rings which are apparent when the rotatable member is rotated.

The rotation of impeller 22 is transferred through shaft 30 and miter gears 50, 66, to cross-shaft 64, which in turn imparts rotation to rotatable member 24. Rotation of rotatable member 24 provides rotation of indicia 88–96, as illustrated in FIG. 8. Indicia 88 blend to form a virtual ring 100 when rotatable member 24 is rotated above a threshold angular velocity in response to wind speed above a threshold linear velocity, e.g. 5 miles per hour. The alternately colored dots 88 blend to provide a color to ring 100 different than either color of dots 88. As noted, the presence of ring 100 when rotatable member 24 is viewed indicates that wind speed exceeds a certain threshold, e.g. 5 miles per hour. As wind speed increases, dots 90, which are spaced farther apart than dots 88, blend to provide the appearance of another virtual ring of color in addition to ring 100. FIG. 8 illustrates rotatable member 24 approaching the speed at which dots 90 are on the verge of forming an additional virtual ring. When rotatable member 24 is rotated at an angular velocity sufficient to blend dots 90 into another virtual ring, this provides an indication that the wind speed has surpassed a second threshold, e.g. 10 miles per hour, greater than the first threshold wind speed. As wind speed increases, dots 92, 94 and 96 cooperate to provide the appearance of additional virtual rings, in the manner described above, to provide a continuing indication as to whether wind speed has exceeded predetermined thresholds. For example, each ring may represent an incremental increase in wind speed of 5 miles per hour so that, when dots 96 provide the appearance of a virtual ring, wind speed exceeds 25 miles per hour.

When rotatable member 24 is not rotated at a speed sufficient to blend dots 88–96 into a virtual ring, dots 88–96 simply provide the appearance of rotating dots.

The alternate coloring of adjacent dots on each of circles A–E assists the user in determining whether wind speed is at or above the threshold indicated by the dots on each circle. That is, the dots form a virtual ring having the appearance of a single color only when wind speed exceeds the predetermined threshold.

Figure 9:
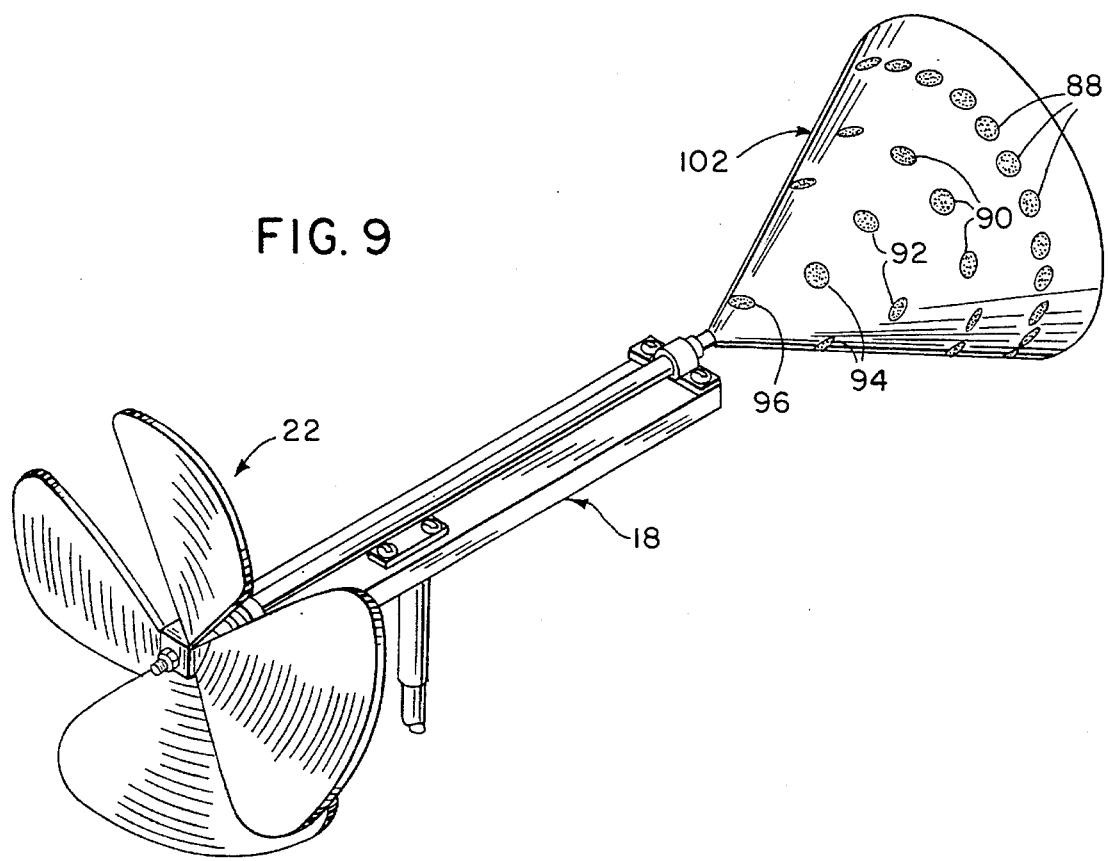
FIG. 9 is a view similar to FIG. 1, showing an alternative embodiment of the rotatable member.
Figure 10:
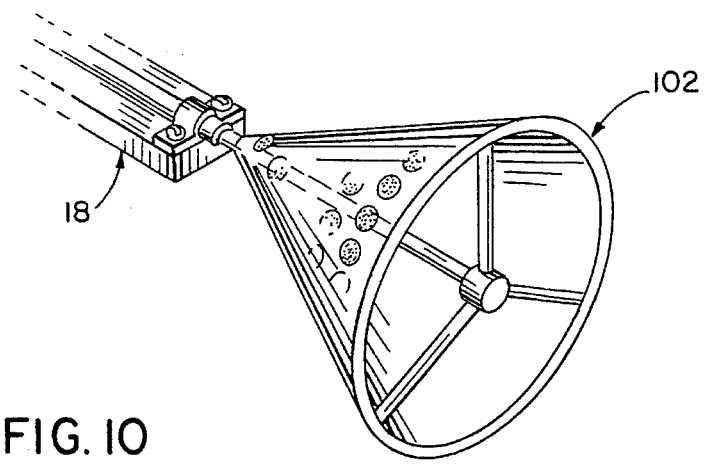
FIG. 10 is a rear isometric view of the rotatable member of FIG. 9.

FIG. 9 illustrates an alternate embodiment of the invention in which a conical rotatable member 102 is substituted for rotatable member 24 and is fixed to the end of shaft 30, to eliminate gearbox 52 and its contents in the embodiment of FIGS. 1–8. Dots 88–96 are provided on the outer surface of cone 102, and are spaced apart substantially as set forth in the preceding table. Dots 88–96 again function as set forth previously to provide successive virtual rings of color upon rotation of cone 102 above predetermined angular velocities in response to rotation of impeller 22. Cone 102 provides sufficient vertical surface area to act as a rudder to cause pivoting movement of base 18 in response to a change in wind direction, as previously described.

Figure 11:
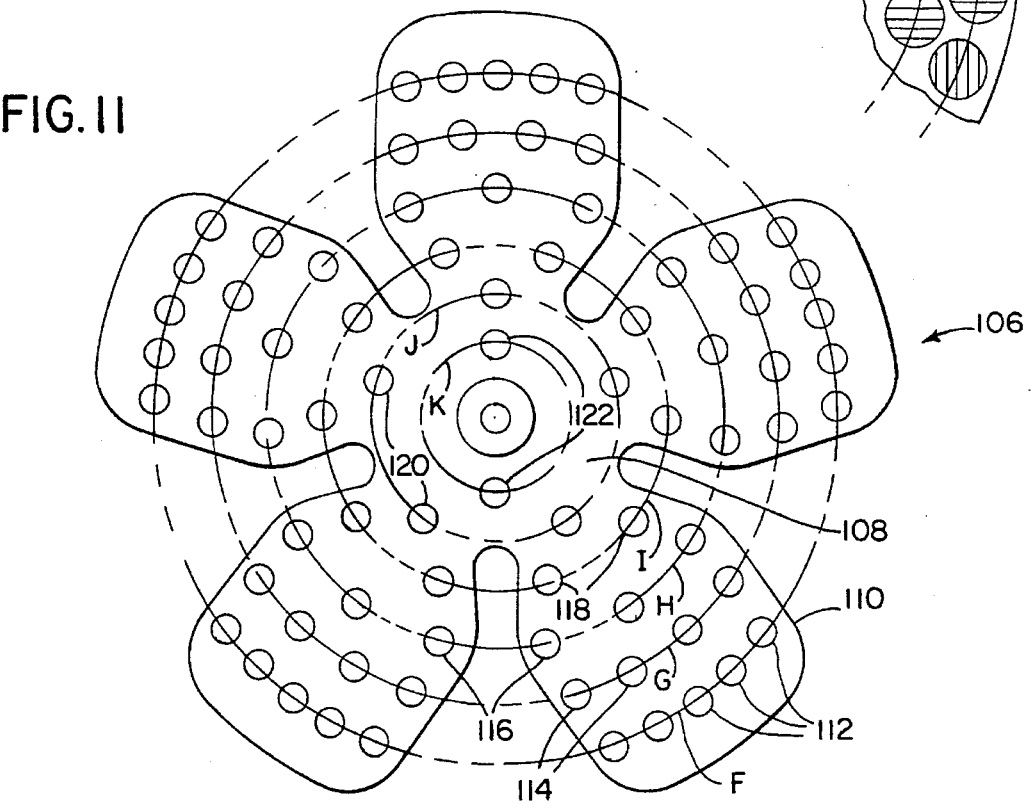
FIG. 11 is a front elevation view of an embodiment of the invention in which the spaced individual indicia are provided on the blades of the impeller.

FIG. 11 illustrates an impeller 106 adapted for use in place of impeller 22 on wind speed indicator 16. Impeller 106 is mounted to the forward end of base 18 in a manner similar to that in which impeller 22 is mounted to base 18. However, when impeller 106 is used, a stationary rudder is mounted to the end of base 18 opposite impeller 106, and the drive system rearwardly of the mounting of impeller 106 is eliminated.

Impeller 106 includes a hub portion 108 and relatively large blades 110 extending outwardly therefrom. Each blade 110 presents a relatively wide surface area.

An outer series of dots 112 are provided on each blade 110, with each dot 112 being centered on the circumference of a circle F, which has its center coincident with the axis of rotation of impeller 106. Succeeding inner series of dots 114, 116 and 118 are provided on impeller blades 110, with the dots in each series of dots 114, 116, 118 being centered on the circumference of concentric circles G, H and I, respectively, which again are coincident with the axis of rotation of impeller 106. Dots 120 and 122 are provided on impeller hub portion 108, and again are centered on the circumference of concentric circles J and K, respectively, which again have centers coincident with the axis of rotation of impeller 106. As in the previous embodiment, dots 114 are closer together than dots 112, dots 116 are closer together than dots 114, and so on toward the center of impeller 106.

As in the embodiment of FIGS. 1–8, the dots in each series of dots may or may not be alternately colored.

The embodiment of FIG. 11 functions similarly to the embodiments of FIGS. 1–10. As a threshold wind speed is attained, impeller 106 is rotated above a predetermined angular velocity at which dots 112 blend to form a virtual ring when viewed. Dots 114–122 likewise define virtual rings when impeller 106 is rotated above predetermined angular velocities as in response to succeeding threshold wind speeds. The alternate colors in each series of dots blend to form a ring having a color different than the constituent colors in order to assist the user in determining whether wind speed has attained a predetermined threshold.

Figure 12:
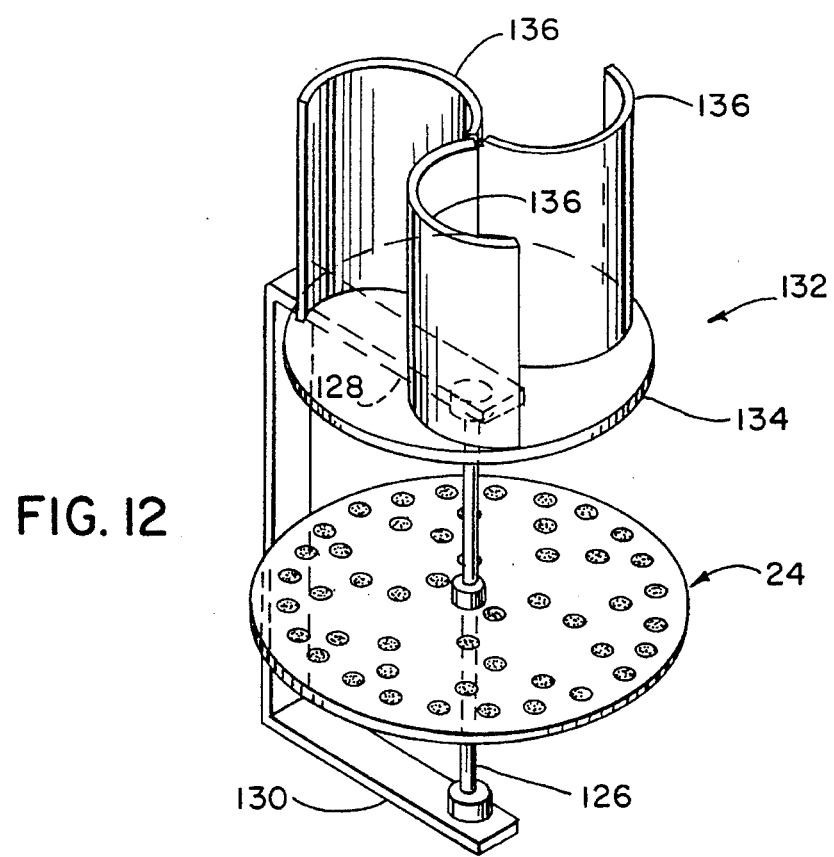
FIG. 12 is an isometric view illustrating another embodiment of the invention.

FIG. 12 illustrates an embodiment of the invention which does not provide an indication of wind direction. In this embodiment, rotatable member 24 is fixed to a shaft 126 which is rotatably secured between upper and lower members 128, 130, of a C-shaped bracket. A turbine 132, which includes a base plate 134 and a series of curved vanes 136, is fixed to shaft 126 for imparting rotation to rotatable member 24. Wind strikes vanes 136 to rotate turbine 132, and rotatable member 24 provides a visual indication of wind speed as described previously in response to rotation of turbine 132.

Figure 13:
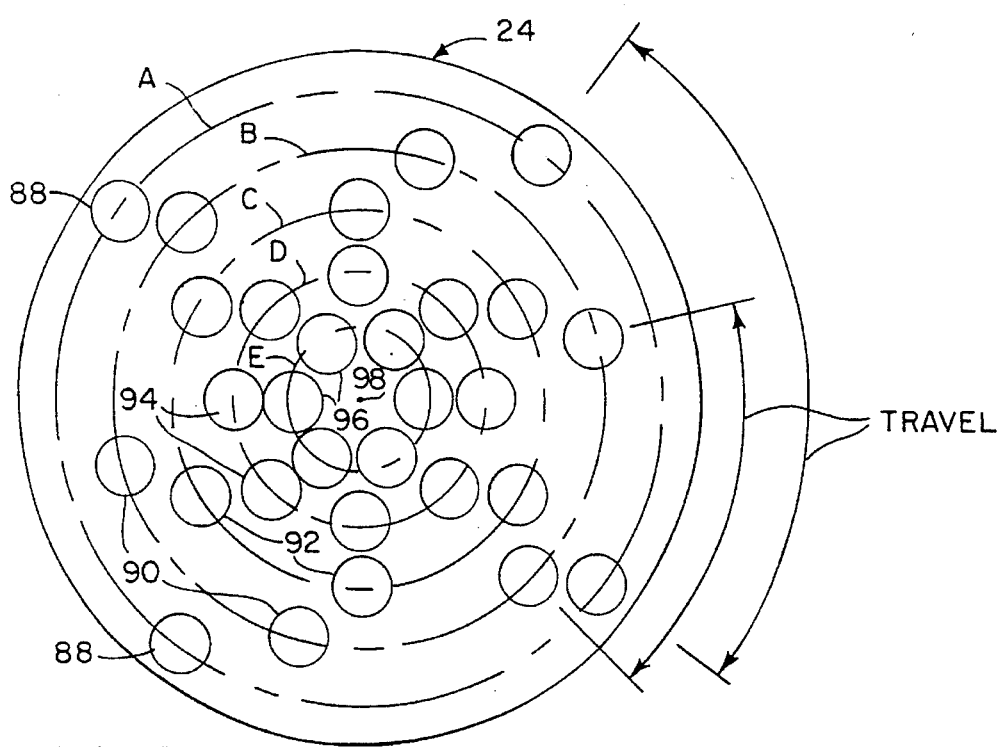
FIGS. 13 and 14 are views similar to FIG. 6, showing alternate arrangements for the individual indicia on the rotatable member.

FIG. 13 illustrates an alternate arrangement of indicia on rotatable member 24. In this arrangement, the individual dots in each successive series of dots are spaced closer together than the dots in each adjacent series, in a direction toward the center of rotatable member 24. This is in contrast to the arrangement of FIG. 6, in which the spacing between the individual dots in each series of adjacent dots is closer together in a direction away from the center of rotatable member 24. Representatively, circles A–E in FIG. 13 are identical to circles A–E of FIG. 6, and dots 88–96 are spaced successively closer together on circles A–E, respectively, in a direction toward center 98 of rotatable member 94. With the embodiment of FIG. 13, dots 96, which are closest to center 98 of rotatable member 24, define the first virtual ring when wind speed exceeds the first threshold, and succeeding virtual rings are formed by dots 94, 92, 90 and 88 as wind speed increases.

Figure 14:
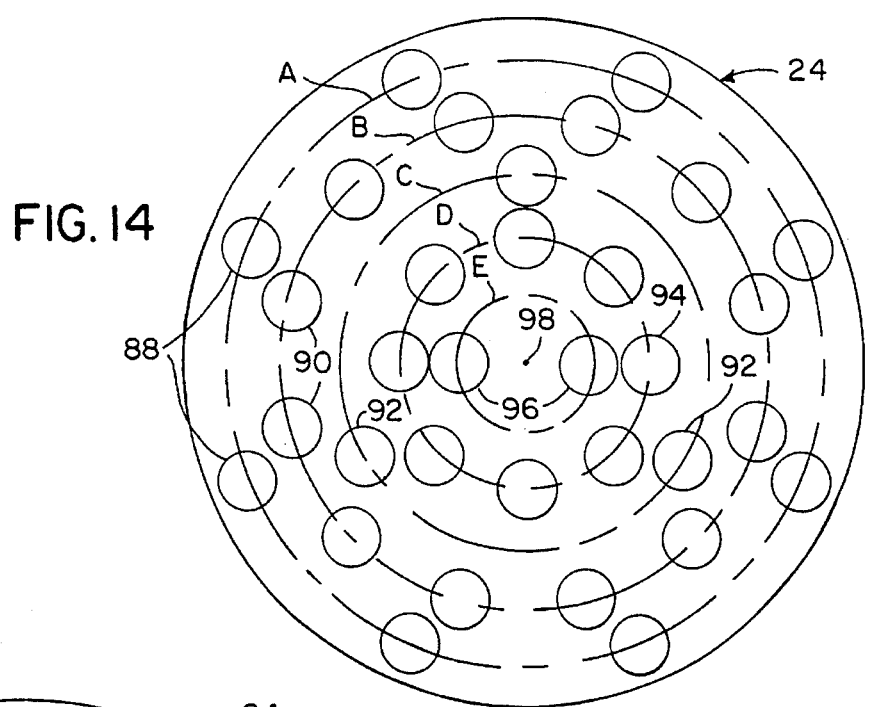

In the embodiment of FIG. 14, dots 88–96 are arranged on circles A–E, respectively, such that the virtual rings formed by dots 88–96 are not successive as wind speed increases. In this embodiment, the spacing between dots 94 on circle D is closest, followed by dots 90 on circle B, dots 96 on circle E, dots 88 on circle A and dots 92 on circle C. The virtual rings formed by dots 88–96 upon rotation of rotatable member 24 thus appear in this order as wind speed increases.

Figure 15:
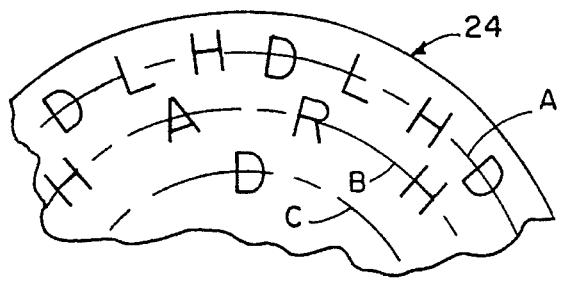
FIG. 15 is a view similar to FIG. 7, showing an alternate form of indicia.

In all of the preceding discussion, the individual indicia which define virtual rings upon rotation of the rotatable member have been shown and described as dots, such as 88–96. As shown in FIG. 15, the indicia may take any form, such as letters of the alphabet. Alternatively, the individual indicia may be spaced holes formed in the rotatable member, or regular or irregular shapes, either colored or not. Regardless of the exact form of the individual indicia, the key is that a constant spacing is maintained between the individual indicia on each circle, and that the spacing varies from circle to circle to define a different number of virtual rings when the speed of rotation of rotatable member 24 exceeds certain predetermined thresholds in response to increasing wind speed.

It can thus be appreciated that the present invention is capable of providing a reliable and accurate indication when wind speed has exceeded a predetermined threshold. The virtual rings, which can be discerned when the alternately colored discrete indicia in each series of indicia blend to form a color different than the constituent colors, enable a user to quickly and easily determine wind speed simply by counting the number of virtual rings which are apparent when viewing the rotatable member. The rotatable member can be made as large or as small as desired. If the rotatable member is made larger, a greater number of concentric individual spaced indicia can be placed on the rotatable member to provide a greater range of wind speed which can be indicated. The invention is relatively simple to construct, yet provides an accurate indication of wind speed.

Various alternatives and embodiments are contemplated as being within the scope of the following claims particularly pointing out and distinctly claiming the subject matter regarded as the invention.

I claim:
1. A wind speed indicator, comprising:
   a rotatable member rotatably driven by the wind; and
   spaced, individual wind speed indicia on the rotatable member for blending into a virtual ring, wherein the spaced individual wind speed indicia comprises at least two bands of indicia, the indicia in a first one of the bands being spaced differently than the indicia in a second one of the bands, wherein the blending of the indicia in each band into a virtual ring indicates that wind speed exceeds a predetermined threshold.

2. The wind speed indicator of claim 1, wherein the spaced, individual wind speed indicia comprise a series of spaced dots on the rotatable member.

3. A wind speed indicator, comprising:
   a rotatable member rotatably driven by the wind;
   spaced, individual wind speed indicia on the rotatable member for blending into a virtual ring, wherein the blending into a virtual ring indicates that wind speed exceeds a predetermined threshold;
   an impeller adapted to be driven by the wind; and
   a drive arrangement interposed between the impeller and the rotatable member for rotating the rotatable member in response to rotation of the impeller by the wind.

4. The wind speed indicator of claim 3, wherein the wind speed indicia comprises a series of spaced individual indicia having as loci the circumference of a circle having the axis of rotation of the rotatable member as its center, wherein the series of spaced individual indicia provide the appearance of a virtual ring when rotated above a first predetermined angular velocity in response to rotation of the impeller caused by a first threshold wind speed.

5. The wind speed indicator of claim 4, wherein the impeller and the rotatable member are rotatably mounted to a base.

6. The wind speed indicator of claim 5, wherein the base is pivotable so as to provide an indication of wind direction, and wherein the rotatable member is mounted to the base so as to function as a rudder to cause pivoting movement of the base responsive to a change in wind direction.

7. The wind speed indicator of claim 6, wherein the impeller and the rotatable member are mounted to the base on opposite sides of the pivot axis about which the base is pivotable.

8. The wind speed indicator of claim 7, wherein the rotatable member comprises a disc-like member rotatably mounted to the base about an axis of rotation substantially perpendicular to the pivot axis about which the base is pivotable.

9. The wind speed indicator of claim 7, wherein the rotatable member comprises a conical member extending along a longitudinal axis oriented substantially perpendicularly to the pivot axis about which the base is pivotable.

10. The wind speed indicator of claim 4, wherein the wind speed indicia comprises one or more additional series of spaced individual indicia, each of which has as loci the circumference of a circle having the axis of rotation of the rotatable member as its center, wherein the first-mentioned and additional series of spaced individual indicia provide the appearance of virtual rings of different diameters when the rotatable member is rotated above different angular velocities in response to rotation of the impeller caused by different threshold wind speeds.

11. The wind speed indicator of claim 10, wherein the wind speed indicia comprise a first series of spaced individual indicia, each of which is located a first distance from the axis of rotation of the rotatable member and which are spaced apart at a first spacing, and wherein the one or more additional series of spaced individual indicia are located a second distance, less than the first distance, from the axis of rotation of the rotatable member, and wherein the individual indicia in the one or more additional series of indicia are spaced apart at a second spacing different than the first spacing.

12. The wind speed indicator of claim 11, wherein the wind speed indicia comprise an outer series of spaced individual indicia located a first distance from the access of rotation of the rotatable member and which are spaced apart at a first spacing, and one or more inner series of spaced individual indicia, each of which is located a second distance, less than the first distance, from the access of rotation of the rotatable member, and wherein the individual indicia in the inner series of indicia are spaced apart at a second spacing greater than the first spacing.

13. The wind speed indicator of claim 11, wherein the wind speed indicia comprise an inner series of spaced individual indicia, each of which is located a first distance from the access of rotation of the rotatable member and which are spaced apart at a first spacing, and one or more outer series of spaced individual indicia, each of which is located a second distance, greater than the first distance, from the access or rotation of the rotatable member, and which are spaced apart at a second spacing less than the first spacing.

14. The wind speed indicator of claim 4, wherein the rotatable member comprises a conical member extending along a longitudinal axis defining the axis of rotation of the rotatable member, and wherein the wind speed indicia are located on the outer surface of the conical member.

15. The wind speed indicator of claim 4, wherein the impeller comprises a series of vanes interconnected with a shaft for rotating the shaft, and wherein the rotatable member is interconnected with the shaft.

16. A wind speed indicator, comprising:

a pivotable base defining first and second ends;

an impeller rotatably mounted to the base toward one of its ends and adapted to be driven by the wind;

a rudder mounted to the base toward its other end, wherein the base pivot axis is located between the impeller and the rudder; and spaced, individual wind speed indicia on the impeller for blending into a virtual ring, wherein the blending into a virtual ring indicates that wind speed exceeds a predetermined threshold.

17. A method of providing a visual indication of wind speed, comprising the steps of:

providing spaced, individual wind speed indicating indicia on a rotatable member, wherein the spaced, individual wind speed indicia comprises at least two bands of indicia, the indicia in a first one of the bands being spaced differently than the indicia in a second one of the bands; and rotating the rotatable member at a speed dependent upon wind speed, wherein the spaced, individual indicia in each band blend into a virtual ring when wind speed exceeds a predetermined threshold, wherein the blending into a virtual ring provides a visual indication of wind speed.

18. A method of providing a visual indication of wind speed, comprising the steps of:

providing spaced, individual wind speed indicating indicia on a rotatable member, wherein the rotatable member comprises an impeller; and rotating the rotatable member at speed dependent upon wind speed by rotatably driving the impeller via the wind, wherein the spaced individual indicia blend into a virtual ring when wind speed exceeds a predetermined threshold, wherein the blending into a virtual ring provides a visual indication of wind speed.

19. A method of providing a visual indication of wind speed, comprising the steps of:

providing spaced, individual wind speed indicating indicia on a rotatable member, wherein the rotatable member comprises a rotatable planar member; and rotating the rotatable member at a speed dependent upon wind speed by drivingly interconnecting an impeller with the rotatable planar member, wherein the impeller is rotatably driven by the wind to impart rotation to the rotatable member, wherein the spaced, individual indicia blend into a virtual ring when wind speed exceeds a predetermined threshold, wherein the blending into a virtual ring provides a visual indication of wind speed.

* * * * *